United States Patent [19]

Gonsalves et al.

[11] 3,739,424
[45] June 19, 1973

[54] SUSPENDED TROLLEY
[76] Inventors: George E. Gonsalves; Felice Dosso, both of 623 Bergen St., Brooklyn, N.Y. 11238
[22] Filed: May 6, 1971
[21] Appl. No.: 140,781

[52] U.S. Cl. ................ 16/98, 16/102, 104/93, 105/148, 295/43
[51] Int. Cl. ...... B60b 37/00, B61b 3/00, B61f 11/00
[58] Field of Search ................ 16/98, 102; 104/93; 105/148, 150; 198/177; 295/43

[56] References Cited
UNITED STATES PATENTS
581,710  5/1897  Gardner.................................. 16/98
3,587,473  6/1971  Weiss et al...................... 105/150 X
1,869,893  8/1932  Haddlesay........................... 16/98 X
2,968,257  1/1961  Schreyer............................ 104/93 X Primary Examiner—Gerald M. Forlenza
Assistant Examiner—Howard Beltran
Attorney—Philip G. Hilbert

[57] ABSTRACT

A wheel construction of the type of suspended trolley which moves on rail means and is mounted on hanger means for moving a load along the rail means; the wheel construction comprising wheel members formed as steel stampings to withstand heavy loads and to extend the normal life thereof.

11 Claims, 6 Drawing Figures

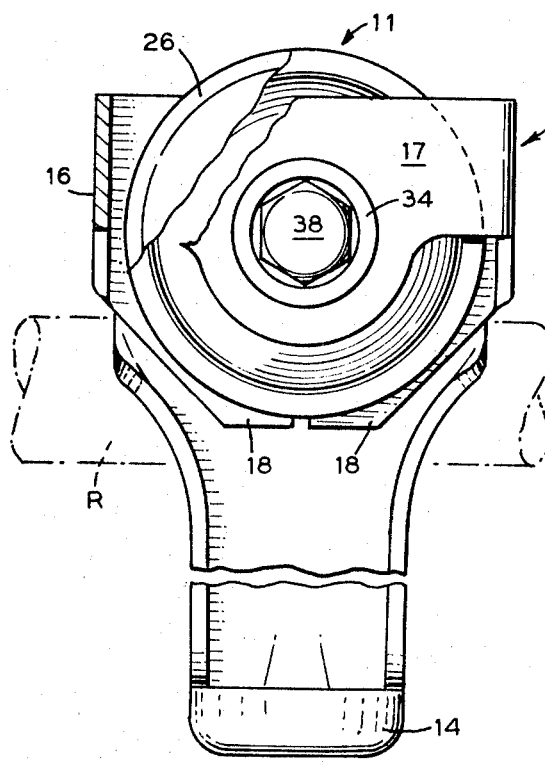
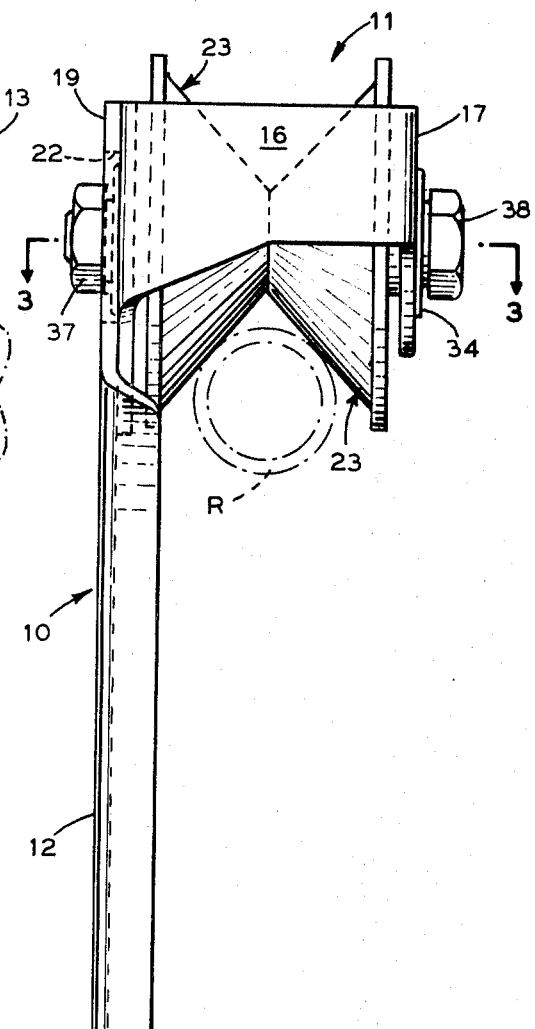
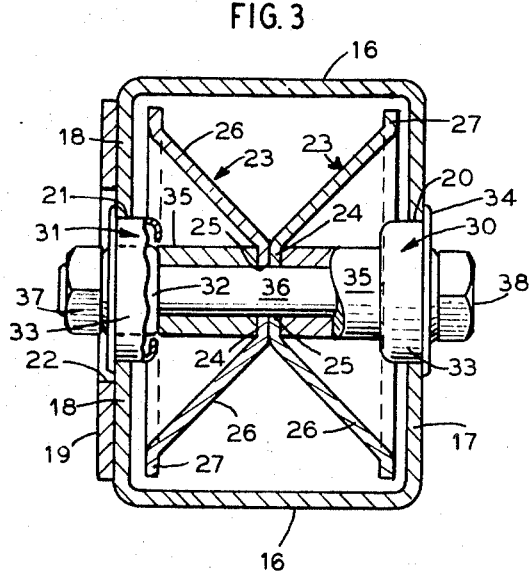
PATENTED JUN 19 1973
3,739,424
SHEET 1 OF 2
FIG. 2
FIG. 1
FIG. 3
INVENTORS
George E. Gonsalves
Felice Dosso
BY
*Philip S. Hilber*
ATTORNEY

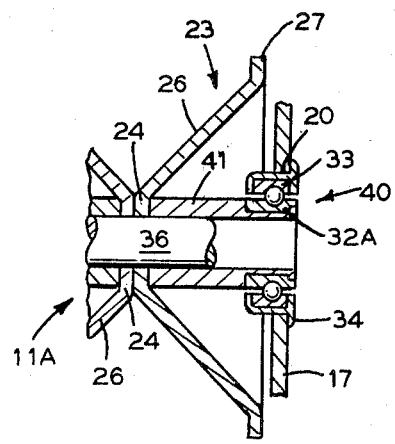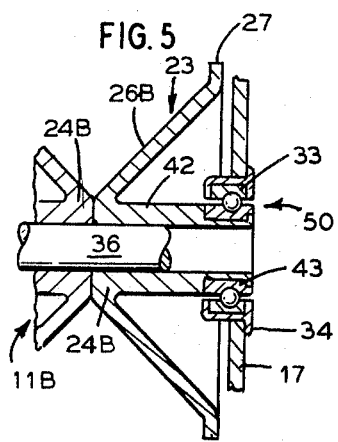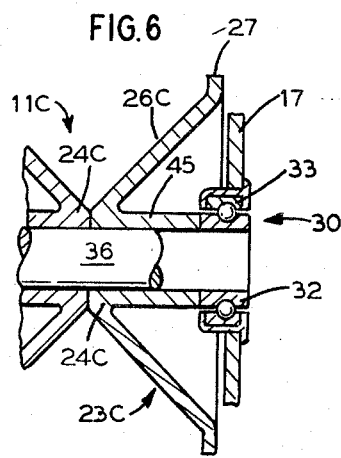

3,739,424

SUSPENDED TROLLEY

BACKGROUND OF THE INVENTION

In various warehousing and other storage facilities, it is common to use overhead rails for moving suspended loads between points in such facilities. The suspension means comprises wheels which move over the rails, the wheels being mounted in a frame portion of a drop bracket which is arranged to carry the suspended load.

Such known wheels are formed from steel castings and have been found to have several disadvantages. Thus, the wheels have a relatively short life, particularly when subjected to excessive loads.

Further, such known wheels are quite heavy thus imposing extra load on the rails when carrying the usual load suspended therefrom; or requiring such suspended load to be decreased thereby decreasing the capacity of the transport system.

Also, such known cast wheels are quite expensive, adding substantially to the initial cost of the system as well as maintenance thereof for replacement wheels.

Accordingly, an object of this invention is to provide an improved wheel construction, which is formed from steel stampings ; which are capable of withstanding excessive loads in use; are relatively light in weight; have an extended life and are relatively inexpensive.

Another object of this invention is to provide a wheel construction of the character described, which comprises a pair of wheel members arranged with their hub portions in abutting relation and mounted on ball bearing means which are mounted on a frame portion of a hanger member or the like; the wheel members and inner portions of the ball bearing means being in axially compressed relation to form a unitary assembly which rotates relative to the outer portion of the ball bearing means.

A further object of this invention is to provide a split wheel construction of the character described, which comprises a pair of stamped steel members having a walled frustro-conical shape to effect a substantial reduction in weight while showing substantial resistance to excessive strains.

Other objects of this invention will in part be obvious and in part hereinafter pointed out.

DESCRIPTION OF THE DRAWING

FIG. 1 is a side elevational view showing a split wheel mounted in a frame, embodying the invention;

FIG. 2 is a front elevational view thereof;

FIG. 3 is a sectional view showing the details of the split wheel and its frame mounting; and FIGS. 4, 5 and 6 are sectional views showing modified forms of the invention.

DESCRIPTION OF THE PREFERRED EMBODIMENT

Referring in detail to the drawing, 10 designates a drop bracket in which is mounted a split wheel construction embodying the invention and generally designated at 11. Such bracket 10 rides on a rail R in suspended relation thereto, by way of wheel 11. It is understood that rail R is laid out in a warehouse or other facility where loads must be moved from place to place; such loads being suspended from a cross member, not shown, which is fixed to the lower ends of a pair of drop brackets 10.

The drop bracket 10 comprises a vertical arm portion 12; an open frame portion 13 fixed to the upper end of arm portion 12; the lower end of arm portion 12 terminating in an inturned, horizontal flange portion 14 formed with an opening 15 for securing thereto one end of said cross member, not shown.

The frame portion 13 comprises a bent steel member having end walls 16 connected by a side wall 17 and split wall portions 18. The split wall portions 18 are welded or otherwise secured to the upper end portion 19 of arm portion 12. The side wall 17 is formed with a centrally located opening 20 which is aligned with an opening 21 formed in split walls 18 and an opening 22 formed in upper arm portion 19, for the purpose hereinafter appearing.

The split wheel construction 11 comprises a pair of similar wheel members 23 which are formed as steel stampings having a uniform wall thickness of a selected value. Each member 23 comprises a central hub portion 24 formed with an axial opening 25; body portions 26 extending angularly from hub portions 24 and of frustroconical shape; the peripheral outer edge of body portions 26 terminating in an annular flange 27.

Means is provided for rotatably mounting wheel 11 between wall 17 and split walls 18. To this end, ball bearing means 30 is mounted in opening 20 in wall 17 and ball bearing means 31 is mounted in openings 21, 22 in wall 18 and arm portion 19. Each of the bearing means 30, 31 comprises the usual annular inner portion 32 and annular outer portion 33; the ball bearings, not shown, being disposed in race means between portions 32, 33 in a known manner. The outer bearing portions 33 include a radial flange portion 34.

The pair of wheel members 23 are arranged with their hub portions 24 in abutting relation and openings 25 thereof in registration. Tubular spacers 35 are located in axial alignment with hub portions 24 and inner portions 32 of bearing means 30, 31. A bolt 36 and nut 37 provides means for holding the assembly of wheel members 23, spacers 35 and inner bearing portions 32 together. The head 38 of bolt 36 bears against the outer edge of the inner bearing portion 32 of bearing means 30 while the nut 37 bears against the outer edge of the inner bearing portion 32 of bearing means 31.

The thus assembled parts are axially compressed together and the assembly is free to rotate as a unit with respect to the outer portions 33 of bearing means 30, 31. It has been found that the stamped steel wheel members 23 forming split wheel 11 provides a construction which is highly resistant to overloads and have an extended life even under adverse conditions of use.

It is understood that the split wheel construction of the instant invention, including a suitable frame for mounting the same, may be used wherever wheels or pullies may be used. Thus, such split wheel construction may provide sheaves for blocks and the like.

The angularity of the V shaped groove of split wheel 11, as well as the thickness of the stampings from which wheel members 23 are formed; may be varied to suit the particular conditions of use.

Other embodiments of the invention are shown in FIGS. 4, 5 and 6. Thus, as shown in FIG. 4, the split wheel construction 11A is similar to that previously described. The same comprises wheel members 23 having frustoconical body portions 26 extending from hub portions 24 and terminating in annular flanges 27. Ball bearing means 40 mounted on frame walls 17, 18 are similar to ball bearing means 30, previously described, except that the inner bearing portions 32A include an integral, inwardly extending tubular portion 41. Tubular portions 41 at their free ends abut the hub portions 24 of members 23. Bolt 36 and nut 37 hold the assembly of wheel members 23 and inner bearing portions 32A in axially compressed relation to each other.

In FIG. 5, there is shown the split wheel construction 11B, which is also similar to wheel construction 11, except as hereinafter described. Thus, wheel construction 11B comprises wheel members 23B having frustoconical body portions 26B, hub portions 24B and outwardly extending tubular portions 42 integral with the hub portions 24B. The tubular portions 42 terminate at their outer ends in an integral, inner bearing portion 43. The inner bearing portion 43 and outer bearing portion 33 form bearing means 50 ; the outer bearing portion 33 being mounted on frame walls 17, 18 as previously described. Bolt 36 and nut 37 hold the assembly of wheel members 23B in axially locked relation, the inner bearing portions 43 being integral therewith.

In FIG. 6, the split wheel construction 11C comprises wheel members 23C which comprise the frustoconical body portions 26C, hub portions 24C and outwardly extending tubular portions 45 integral with the hub portions 24C. The outer free ends of tubular portions 45 abut the inner bearing portions 32 of bearing means 30; the outer bearing portion 33 thereof being mounted on frame walls 17, 18, as previously described. Bolt 36 and nut 37 axially compress the wheel members 23C and inner bearing portions 32 together, as previously described.

We claim:

1. In combination, a wheel and a frame having opposed frame portions for rotatably mounting said wheel therebetween, said wheel comprising a pair of wheel members, each wheel member comprising a hub portion and an annular body portion extending angularly from said hub portion, said wheel members being arranged with their hub portions in opposed contacting relation and said body portions in divergent relation, a pair of bearing means respectively mounted on said frame portions in aligned relation to each other, each bearing means comprising radially related inner and outer portions in rotatable relation to each other, spacer means disposed between each of said hub portions and the inner portion of an associated bearing means, and axially disposed means for clamping the hub portions of said wheel members, said spacer means and the inner portions of said bearing means together as a unitary assembly for rotation relative to said outer portions of the bearing means.

2. The combination as in claim 1, wherein the body portions of said wheel members are frustoconical in shape.

3. The combination as in claim 1, wherein said frame portions are formed with aligned openings, the outer portions of said bearing means being fixed in said openings.

4. The combination as in claim 3, wherein said securing means comprises bolt means for axially compressing the inner portions of said bearing means, said spacer means and the hub portions of said wheel members together.

5. The combination as in claim 1 wherein said wheel members are steel stampings.

6. The combination as in claim 1, wherein said spacer means comprising tubular members, the inner ends of said tubular members abutting outer portions of said hub portions and the outer ends of said tubular members abutting inner edge portions of the inner portions of said bearing means.

7. A wheel construction comprising a pair of wheel members, each wheel member comprising a hub portion and an annular body portion extending from said hub portion, said wheel members being arranged with their hub portions in axially abutting relation, bearing means in axially spaced relation to each hub portion and disposed outwardly thereof, said bearing means comprising radially related inner and outer portions in rotatable relation to each other, tubular means extending axially between each hub portion and the inner portion of the bearing means associated therewith, and axially disposed means for securing the hub portions of said wheel members, said tubular means and the inner portions of said bearing means together as a unitary assembly for rotation relative to the outer portions of said bearing means.

8. A wheel construction as in claim 7, and further including a pair of opposed mounting members, the radially extending outer portions of said bearing means being respectively mounted in said mounting members.

9. A wheel construction as in claim 7, wherein the radially extending inner portions of said bearing means are integral with the outer end portions of said tubular means.

10. A wheel construction as in claim 9, wherein the inner ends of said tubular means abut the hub portions of said wheel members.

11. A wheel construction as in claim 7 wherein said tubular means comprises an inner end portion integral with the hub portion of said wheel members, the outer end portion of said tubular means axially abutting the inner portion of said bearing means.

* * * * *